(12) United States Patent
Soh et al.

(10) Patent No.: US 7,711,343 B2
(45) Date of Patent: May 4, 2010

(54) FLAT TURNER MODULE WITH A STANDARD CONNECTOR

(75) Inventors: Kim Leng Soh, Singapore (SG); Ernst Bressau, Singapore (SG)

(73) Assignee: NXP B.V., Eindhoven (NL)

( * ) Notice: Subject to any disclaimer, the term of this patent is extended or adjusted under 35 U.S.C. 154(b) by 392 days.

(21) Appl. No.: 11/578,880

(22) PCT Filed: Apr. 26, 2005

(86) PCT No.: PCT/IB2005/051347

§ 371 (c)(1),
(2), (4) Date: Aug. 15, 2007

(87) PCT Pub. No.: WO2005/107250

PCT Pub. Date: Nov. 10, 2005

(65) Prior Publication Data

US 2007/0291181 A1    Dec. 20, 2007

(30) Foreign Application Priority Data

Apr. 29, 2004   (EP) .................................. 04300242

(51) Int. Cl.
*H04B 1/10* (2006.01)
(52) U.S. Cl. ........................ 455/301; 455/300; 455/347; 455/349

(58) Field of Classification Search .......... 455/300–301
See application file for complete search history.

(56) References Cited

U.S. PATENT DOCUMENTS

| | | | | |
|---|---|---|---|---|
| 3,679,829 A * | 7/1972 | Hofmeister et al. | ......... | 455/300 |
| 3,946,344 A | 3/1976 | Wilkinson | | |
| 4,030,052 A | 6/1977 | Pelletier | | |
| 5,438,690 A * | 8/1995 | Tsukuda | ..................... | 455/300 |
| 5,913,173 A | 6/1999 | Ohwaki et al. | | |
| 6,160,571 A * | 12/2000 | Wang | ......................... | 455/349 |
| 6,373,711 B2 * | 4/2002 | Yamauchi et al. | .......... | 455/90.1 |
| 7,113,061 B2 * | 9/2006 | Ootori et al. | ................ | 361/816 |
| 2005/0054320 A1 * | 3/2005 | Noro et al. | ................... | 455/344 |

FOREIGN PATENT DOCUMENTS

| EP | 1 414 238 A2 | 4/2004 |
|---|---|---|
| JP | 10 215148 | 8/1998 |

* cited by examiner

*Primary Examiner*—Lana N Le

(57) ABSTRACT

The present invention relates an RF tuner module that comprises one or more standard RF connectors. As, relative big, standard RF connectors are widely in use but at the same time there is a pressure to make products smaller an RF tuner module design is size constrained. The invention describes a measure to make an RF tuner module, with a standard RF-connector, smaller by extending one of the shielding sides of the RF tuner in order to facilitate a proper mounting of the RF connector to the RF tuner module.

10 Claims, 4 Drawing Sheets

FLAT TURNER MODULE WITH A STANDARD CONNECTOR

FIELD OF THE INVENTION

The present invention also relates to a tuner module with a reduced height that comprises a standard RF connector.

Moreover the present invention relates to an apparatus comprising a reduced height tuner module that comprises a standard RF connector.

The present invention is particularly relevant for consumer electronics and PC products where space limitations forces module and component makers to develop ever-smaller products, whilst being able to interface to the outside world with standard connections. Such products may include LCD-TV, flat-STB, cable modems and Multi-Media equipped PC's and gadgets with, e.g., Audio, Video and or data reception capabilities.

BACKGROUND OF THE INVENTION

In the field of consumer electronic products, such as an LCD TV, Set-Top-Box, a cable modem, a move towards slim designs and smaller components is required. This includes the requirement for a smaller (low-profile) RF (Radio Frequency) tuner module. However, the requirement of the use of standard RF connectors such as IEC and F-type connectors (which typically can be found as part of a RF tuner module) creates a restriction to the design of a low-profile RF tuner module.

A prior art, high vertical profile, RF tuner module typically comprises a metal-stamped frame, which houses an internal electrical circuit. It has both a top and bottom metal cover that closes the frame for shielding purposes. The module also may comprise one or more standard RF connectors, I/O (Input/Output) pins and mounting tags on the frame. Such as module can be applicated by, e.g., inserting its signal pins and mounting tags onto, e.g., a chassis PCB with a matching footprint. An RF signal is fed into the tuner module via an RF coaxial cable with a matching RF connector at its end.

Another prior art low-profile design RF tuner module does not comprise a standard RF connector. The RF input is fed instead to the module via one or more signal pins through its cover. Such a module can also be applicated by, e.g., inserting its signal pins (including an RF-in signal pin) and mounting tags onto, e.g., a chassis PCB with a matching footprint. The RF-in pin is connected to a separate RF connector via copper track on the chassis PCB. This affects the RF signal coming into the tuner module due to signal disturbances though the copper track connections, and also poor matching of the input impedance via the pin connector, resulting in bad performance of the RF tuner module.

SUMMARY OF THE INVENTION

It is, accordingly, an object of the present invention to provide tuner module comprising a standard RF input connector.

It is another object of the invention to provide a reduced height tuner module comprising a standard RF input connector without compromising on signal integrity.

It is yet another object of the invention to provide a chassis PCB (i.e., a PCB plus components) comprising a reduced height tuner module comprising a standard RF input connector that results in an overall thinner design of the chassis PCB.

It is yet another object of the invention to provide an apparatus or a consumer electronics product comprising a reduced height tuner module comprising a standard RF input connector that results in an overall thinner design of the apparatus.

In one embodiment, one of the shielding sides of the RF tuner is extended in order to facilitate a proper mounting of a standard, relative big, RF connector to the RF tuner module.

In another embodiment, a chassis PCB comprises the RF tuner of the previous embodiment that is mounted on the chassis PCB such that the RF connector extends over an edge of the chassis PCB. This results in an overall slimmer PCB design.

In yet another embodiment, an apparatus comprises a chassis PCB wherein the RF tuner of the first embodiment is mounted on the chassis PCB such that the RF connector extends over an edge of the chassis PCB. This results in an overall smaller apparatus design.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

Throughout the drawings, the same reference numeral refers to the same element, or an element that performs substantially the same function.

DETAILED DESCRIPTION OF THE INVENTION

Figure 1A:
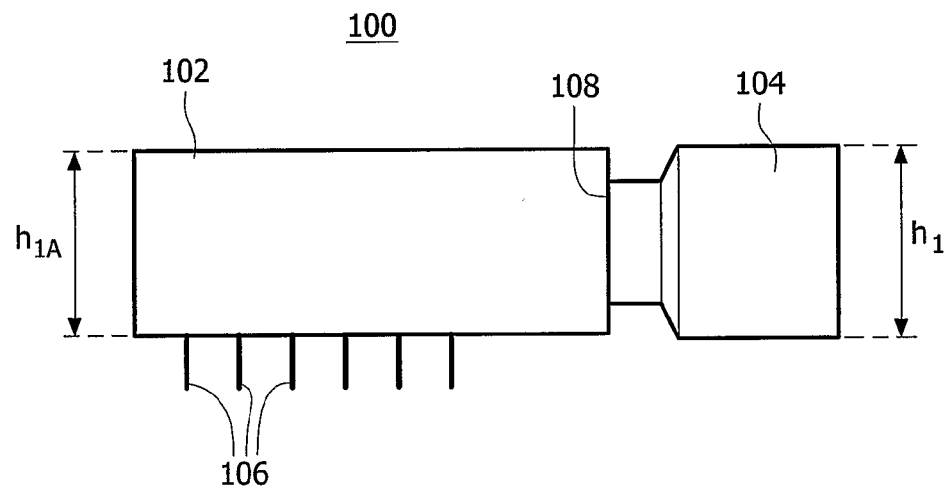
FIG. 1a shows a first prior art RF tuner module.

FIG. 1a shows a first prior art RF tuner module 100. Module 100 comprises shielding body 102, shielding body sidewall 108, RF-connector 104 and signal pins 106. RF tuner module height h1A (that is the thickness of a tuner module, inclusive of both bottom and top covers) is constrained by the size h1 of RF-connector 104 as connector 104 needs sufficient surface at shielding body sidewall 108 in order to be adequately attached.

Figure 1B:
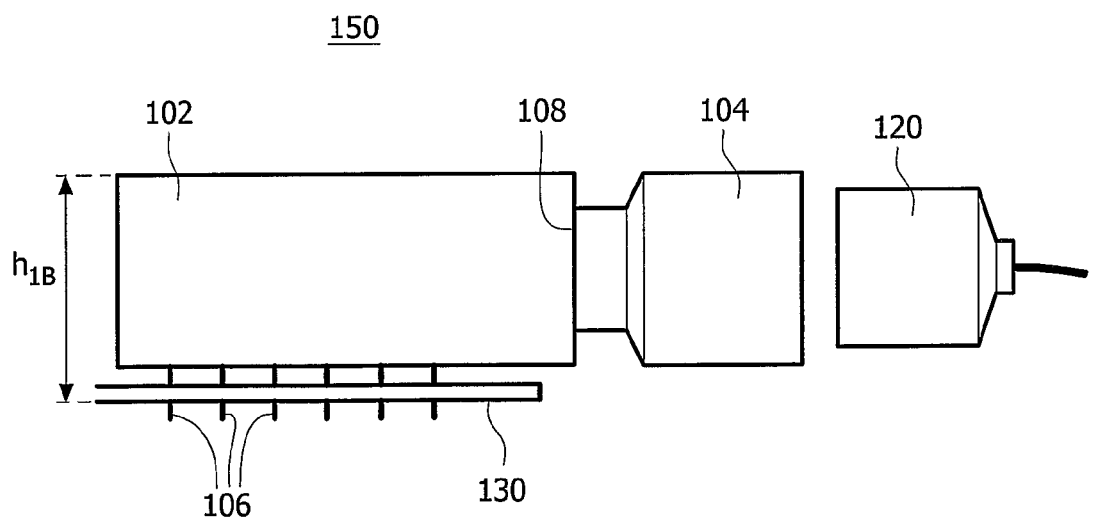
FIG. 1b shows a side view of a first chassis PCB comprising the first prior art RF tuner module.

FIG. 1b shows a side view of a first chassis PCB (Printed Circuit Board) 150 comprising the first prior art RF tuner module 100. Module 150 also comprises PCB 130 wherein signal pins 106 of module 100 have been soldered to PCB 130. FIG. 1b also shows an RF cable and connector 120. First chassis PCB height h1B at least comprises the height of RF connector 120 and the thickness of PCB 130.

Figure 2A:
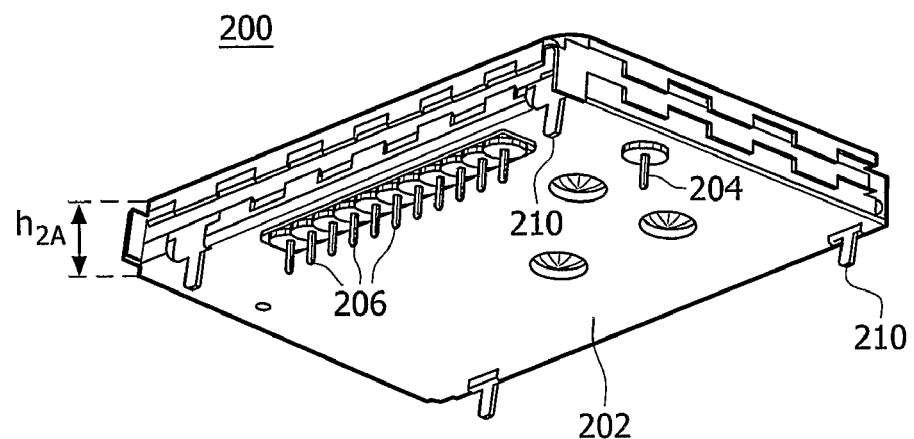
FIG. 2a shows a second prior art RF tuner module.

FIG. 2a shows a second prior art RF tuner module 200. RF tuner module 200 comprises shielding body 202, RF-signal pin 204, signal pins 206 and grounding lips 210. Signal pins 206 are exposed from shielding body 202 through a hole. As module 200 does not comprise an RF connector such as module 100, RF tuner module height h2A can be less than RF tuner module height h1A.

Figure 2B:
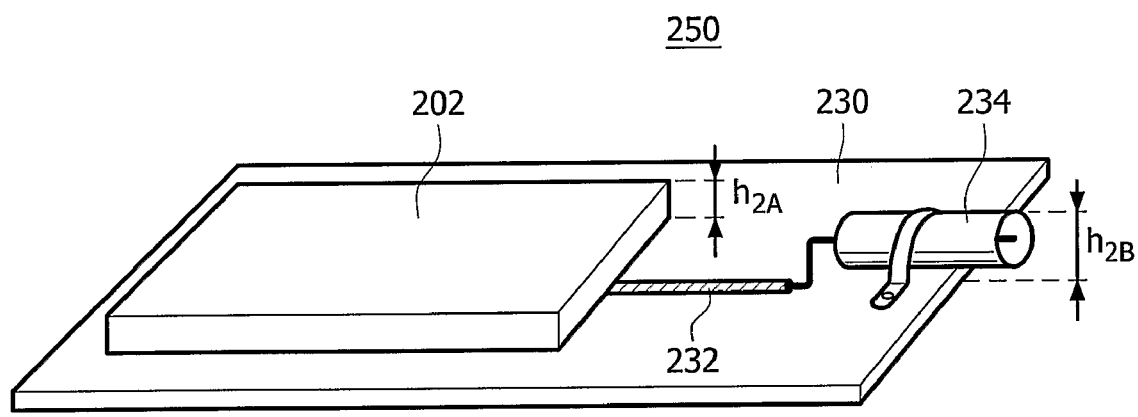
FIG. 2b shows a side view of a second chassis PCB comprising the second prior art RF tuner module.

FIG. 2b shows a side view of a second chassis PCB 250 comprising the second prior art RF tuner module 200. Second chassis PCB 250 also comprises PCB 230, RF-signal track 232, and RF-connector 234. Second chassis PCB height h2B at least comprises the height of RF connector 234 and the thickness of PCB 230. Therefore, although RF tuner module height h2A can be less than RF tuner module height h1A, the overall height of chassis PCB is still constrained by h2B. Another disadvantage of second chassis PCB 250 is that RF-signal track is not shielded and this in turn can cause degradation of received RF signals.

Figure 3A:
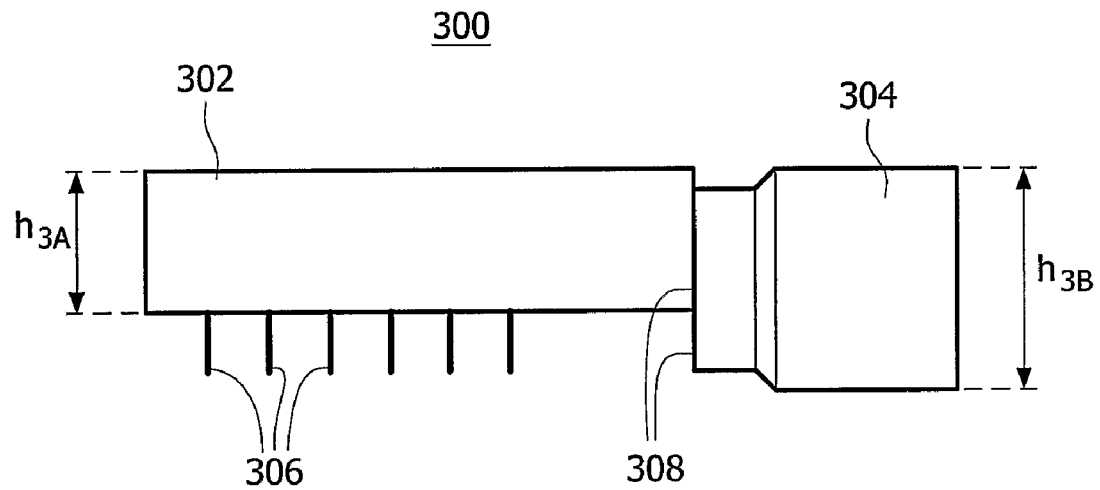
FIG. 3a shows a side view of the RF tuner module in accordance with the invention.

FIG. 3a shows a side view of the RF tuner module 300 in accordance with the invention. RF tuner module 300 comprises shielding body 302, shielding body sidewall 308, RF-connector 304 and signal pins 306. RF tuner module height h3A (that is the thickness of a tuner module inclusive of both top and bottom cover, but not measuring an RF-connector) is not constrained by the size h3B of RF-connector 304 as shielding body sidewall 308 has been extended downwards and by doing so provides a sufficient surface for RF-connector 304 to be adequately attached. RF-connector 304 can be of a standard type such as an "F-connector" (typically found in the rear of a USA Television or radio set for connection to Cable and/or antenna) or an "IEC-connector" (IEC169-2; typically found in the rear of a European Television or radio set for connection to Cable and/or antenna) or other, e.g., emerging types of, connectors.

Figure 3B:
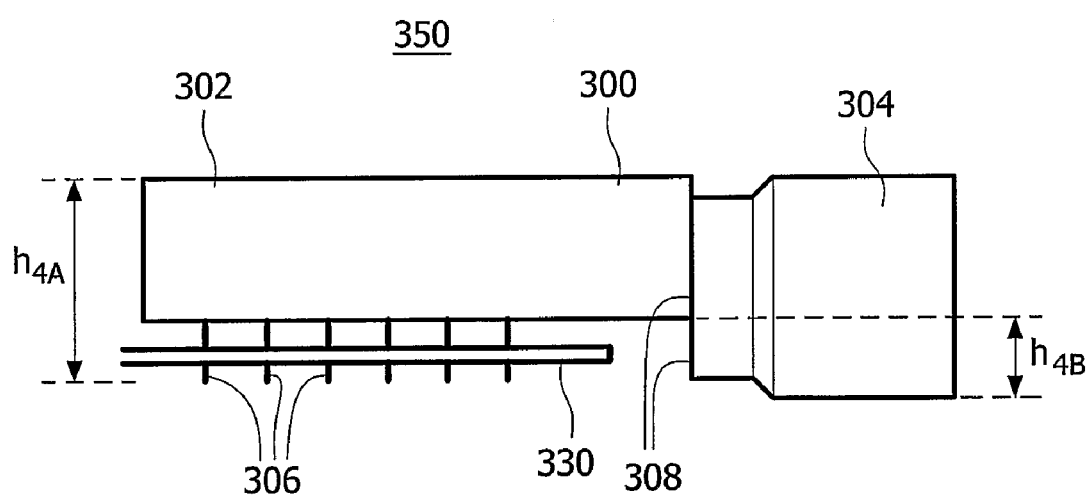
FIG. 3b shows a side view of a third chassis PCB comprising the RF tuner module in accordance with the invention.

FIG. 3b shows a side view of a third chassis PCB 350 comprising the RF tuner module 300 in accordance with the invention. Chassis PCB 350 also comprises PCB 330.

Shielding body 302 and shielding body sidewall 308 can be produced from a single-piece of metal. Shielding body 302 can be stamped with a lower height. Provisions for one or more standard RF connectors 304 can be made at one end of the shielding body in order to form shielding body sidewall 308. By doing so, the end of the shielding body (that is shielding body sidewall 308), has a height that is larger than the rest of the shielding body. This in turn provides adequate area for the fixation of the RF connector 304. RF tuner module 300 can be mounted on PCB 330, with the shielding body sidewall 308 (together with RF connector 304) over the edge of PCB 330.

Third chassis PCB height h4A comprises RF tuner module height h3A plus the thickness of PCB 330. Therefore, the overall height of chassis PCB 350 has been reduced by h4B compared to prior art chassis PCB 150.

Third chassis PCB 350 does not expose any RF signal to the outer world so RF signal integrity will be much better as compared to prior art chassis PCB 250.

Figure 3C:
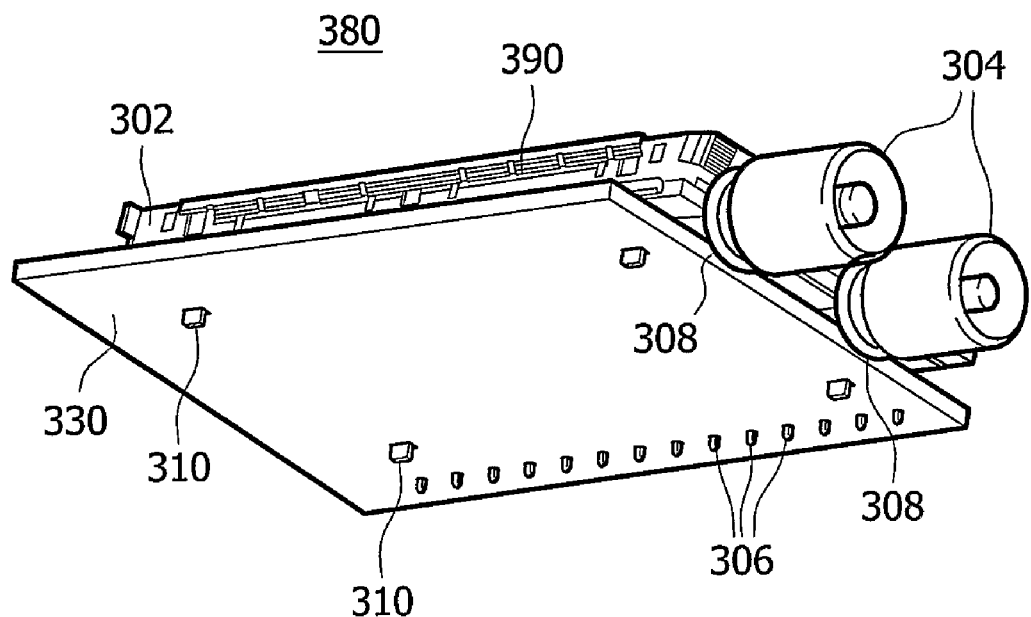
FIG. 3c shows another side view of the third chassis PCB comprising the RF tuner module in accordance with the invention.

FIG. 3c shows another side view of fourth chassis PCB 380 comprising RF tuner module 390 in accordance with the invention. RF tuner module 390 comprises two RF connectors 304 and shielding body sidewall 308. It is clearly shown that shielding body sidewall 308 is extended downward at the location of RF connectors 304 in order to provide sufficient area of fixation of the connectors 304. Fourth chassis PCB 380 comprises RF tuner module 390 that is mounted on PCB 330 such that the RF connectors 304 extend over an edge of chassis PCB 380.

One skilled in the art recognizes that extending an RF connector over an edge of a chassis PCB can take different shapes. For instance, a PCB should have a place with a cutout area. This area should be sufficiently large so that an RF-connector can be lowered into the PCB at that area. Therefore, using a tuner of the invention enables the design of a chassis PCB that has an overall thinner or slimmer design.

Figure 4:
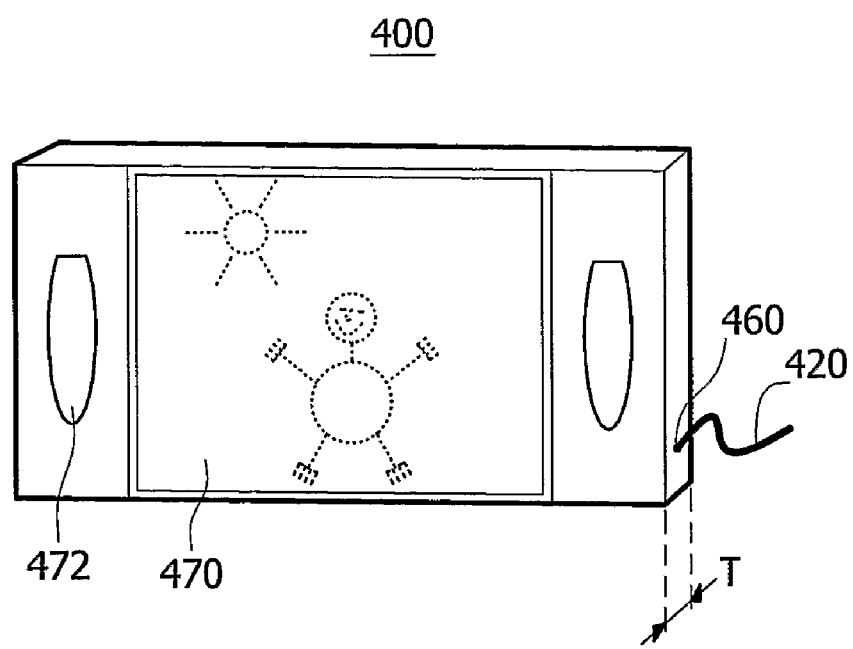
FIG. 4 shows an apparatus comprising the RF tuner module in accordance with the invention.

FIG. 4 shows an apparatus 400 that comprises a flat LCD Television. Apparatus 400 comprises a RF tuner module 460 (although only an RF connector of module 460 is visible in FIG. 4) in accordance with the invention, flat speaker 472, LCD screen 470 and RF-cable 420 connected to RF tuner module 460. Due to the application of a reduced RF tuner module in accordance with the invention, thickness T of apparatus can be reduced. This results in a more stylish design something that the market requires.

An LCD Television is taken as example. The reader will understand that apparatus 400 can take the shape of a wide variety of products as described earlier in the invention and therefore apparatus 400 is not limited to the example of the LCD Television. Other examples of such an apparatus include a set-top-box, a cable modem, a Multi-Media equipped PC, a gadget with, e.g., Audio, Video and or data reception capabilities and a USB-TV box.

One of ordinary skill in the art will recognize that alternative schemes can be devised by making tweaks in the RF tuner module and/or chassis PCB described.

The foregoing merely illustrates the principles of the invention. It will thus be appreciated that those skilled in the art will be able to devise various arrangements which, although not explicitly described or shown herein, embody the principles of the invention and are thus within its spirit and scope.

The invention claimed is:

1. An RF tuner comprising:
   a shielding body;
   a shielding body sidewall that forms with the shielding body an RF tuner case;
   an RF connector, wherein the shielding body comprises a bottom, the bottom comprises one or more holes from which one or more signal pins extend, and wherein the diameter of the RF connector is larger than the height of the shielding body and wherein the shielding body side wall at least partially, extends over, at least one of, the bottom side and the top side of the shielding body in order to provide an adequate area for fixation of the RF connector to the shielding body sidewall.

2. The RF tuner of claim 1, wherein the RF connector comprises one of a standard IEC-connector and a standard F-connector.

3. The RF tuner of claim 2, wherein the height of the shielding body is smaller than 11 mm.

4. The RF tuner of claim 1, wherein at least a part of the shielding body and the shielding body sidewall have been formed from one metal piece.

5. A chassis PCB comprising:
   a PCB;
   the RF tuner of claim 1, wherein the shielding body side wall, at least partially, extends over the bottom side of the shielding body and wherein the RF tuner is mounted on the PCB such that the RF connector extends over an edge of the PCB.

6. The chassis PCB of claim 5, wherein the RF connector comprises one of a standard IEC-connector and a standard F-connector.

7. The chassis PCB claim 6, wherein the height of the shielding body is smaller than 12 mm.

8. The chassis PCB of claim 5, wherein at least a part of the shielding body and the shielding body sidewall have been formed from one metal piece.

9. An apparatus comprising the chassis PCB of claim 5 enabling a slimmer design of the apparatus.

10. The apparatus of claim 9, comprising one of a LCD-TV, a Set-top-box, a cable modem, a CE-gadget, a USB-Tuner box and a Multi-Media equipped PC.

* * * * *